Figure 1:
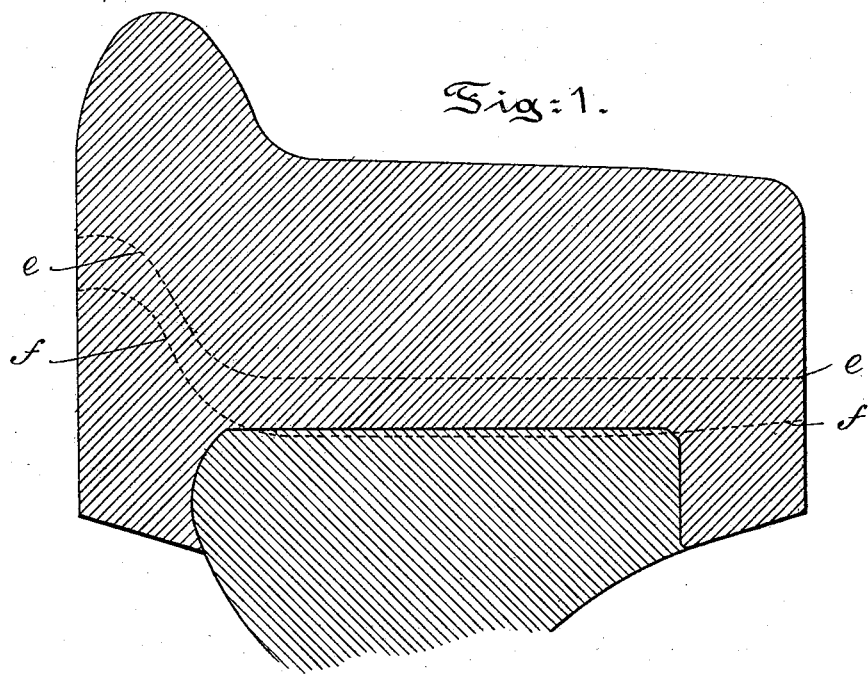

(No Model.)   2 Sheets—Sheet 1.

W. J. TAYLOR.
CAR WHEEL.

No. 552,155.  Patented Dec. 31, 1895.

Witnesses:
Thomas M. Smith.
Richard C. Maxwell.

Inventor:
William J. Taylor,
By J. Walter Douglass
Attorneys.

(No Model.)

2 Sheets—Sheet 2.

W. J. TAYLOR.
CAR WHEEL.

No. 552,155.

Patented Dec. 31, 1895.

Witnesses:
Thomas M. Smith.
Richard C. Maxwell.

Inventor:
William J. Taylor,
By J. Walter Douglass,
Attorney.

UNITED STATES PATENT OFFICE.

WILLIAM J. TAYLOR, OF BOUND BROOK, NEW JERSEY.

CAR-WHEEL.

SPECIFICATION forming part of Letters Patent No. 552,155, dated December 31, 1895.

Application filed September 25, 1895. Serial No. 563,653. (No model.)

*To all whom it may concern:*

Be it known that I, WILLIAM J. TAYLOR, a citizen of the United States, residing at Bound Brook, in the county of Somerset and State of New Jersey, have invented certain new and useful Improvements in Car-Wheels, of which the following is a specification.

My invention has relation to the manufacture of a car-wheel known as a "steel-tire welded" wheel—that is, a steel tire with a cast-iron center welded to the tire—and it relates particularly to the construction or form of the tire whereby a far better interlocking of the same with the cast-iron center is secured and a maximum mileage or service of the wheel is obtained with a minimum weight of tire and with entire safety in use to the end of the life of the tire of the wheel. Hitherto it has been customary to make these wheels with two forms of tires, one known as the "locking" and the other as the "non-locking" section. The former may be described as a tire having inwardly-projecting ribs or side flanges with a cast-iron center fused or welded thereto; but such a wheel possessed serious disadvantages, in that if the steel tire was entirely worn through to the iron under the tread the flange was liable to break off at the point of union of one with the other. In the latter section the inner periphery of the tire was usually slightly concaved about the center and therefrom generally merging into flat walls; but the objection to such section is that there was no interlocking between the steel rim or tire and the cast-iron center, and hence in case of imperfect weld, fracture or cracking of the tire in cross-section there was nothing to hold it from flying off from the center. In addition to this, practically the same objection as to the safety of the flange was encountered when the tread was entirely worn out, only in such case the seam or weld between the tire and the center was horizontal instead of vertical.

The principal objects of my invention are, first, to overcome the above-mentioned disadvantageous features by constructing a steel-tire welded wheel in which the tire is made with an inner interlocking rib for securing the same to the center or body of the wheel when cast in addition to welding or fusing of the same, so that in the wear of the rim even to the body the flange will be firmly interlocked thereto and safe even with imperfect welding and the tire entirely worn out at the throat, due to the proper location of the interlocking rib of the tire of the wheel.

My invention stated in general terms consists of a car-wheel constructed and arranged in substantially the manner hereinafter described and claimed.

The nature, characteristic features, and scope of my invention will be more fully understood from the following description, taken in connection with the accompanying drawings, forming part hereof, and in which—

Figure 2:
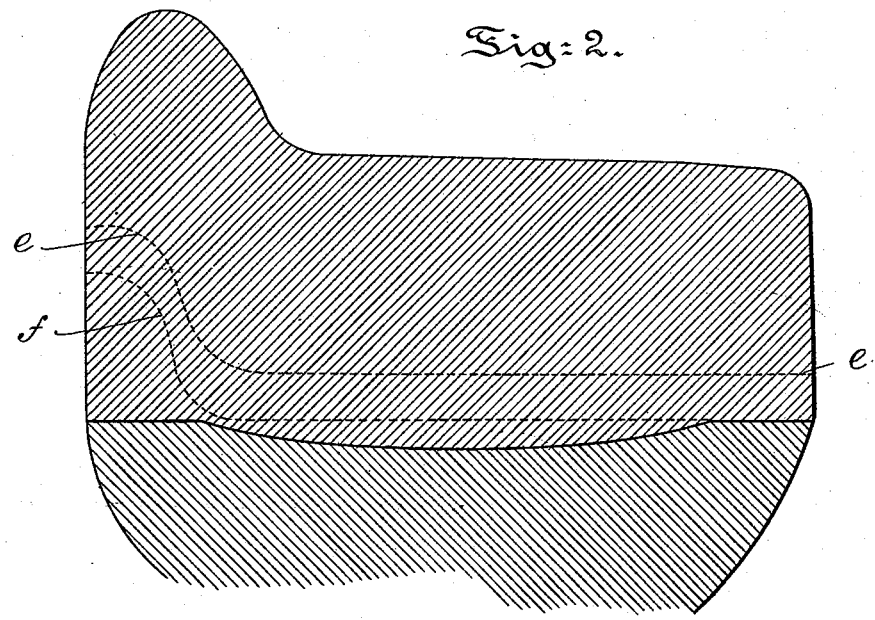

Figure 1 is a sectional view of the rim of a wheel, showing the well-known manner of constructing a locking steel-tire welded car-wheel, and the dotted lines indicating respectively in the wear of the tire in the direction of the body the safe and unsafe limits of such a wheel. Fig. 2 is a similar view of a plain or non-locking section, showing by dotted lines in the wear of the tire in the direction of the body of the wheel the safe and unsafe limits thereof; and Fig. 3 is a similar view of a car-wheel embodying the particular features of my invention with the tire of the wheel provided with a single interlocking rib established with the body of the wheel by welding or fusing cast-iron therewith so that the entire steel tire may be worn to the body and the flange worn also to the extent indicated by the dotted lines and still be safe and substantial, due to the support which is afforded by the particular location and arrangement of the rib of the tire welded to the body of the wheel, to not only interlock the tire-section, but also the flange even when the tread is worn out.

Figure 3:
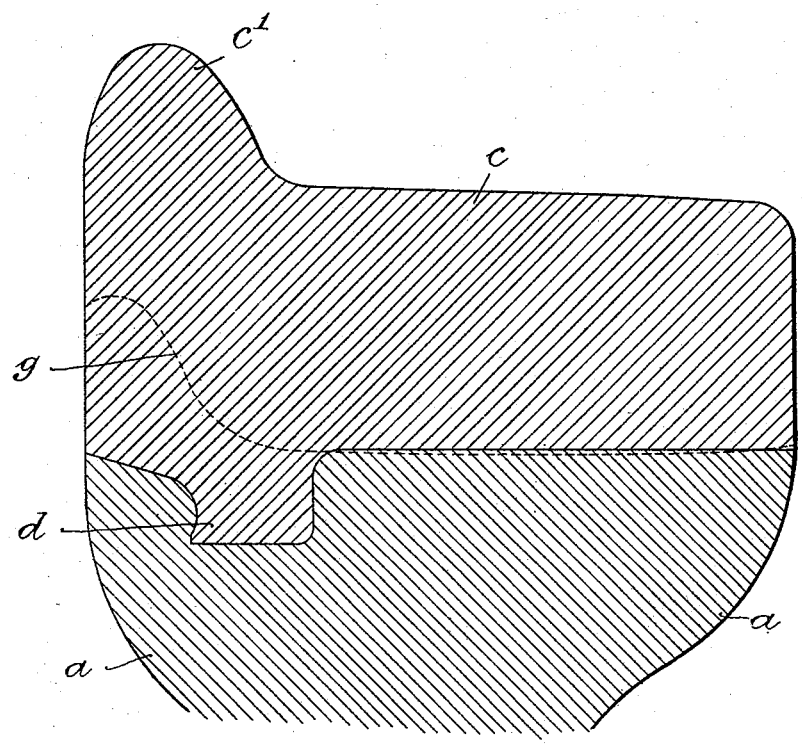

Referring to the drawings, $a$ in Fig. 3 represents the body of the wheel preferably of cast-iron.

$c$ is the tire composed preferably of steel, as well as the flange $c'$, and $d$ is the inner interlocking-rib, which is formed integral with said tire and preferably of the type or form and located as illustrated in Fig. 3. The tire is heated to proper temperature for fusing or welding to cast-iron or molten steel and introduced in the mold just before pouring the center in the usual manner. By this construction of a tire-welded wheel the life of the same is prolonged until the tire is entirely worn out as to the tread, owing to the special construction or form and particular location of the interlocking rib $d$, as illustrated in Fig. 3, whereby the flange is made absolutely secure and safe even with the tread worn to the iron body of the wheel. This is not the case with any of the other tire-sections as hitherto made and particularly such as illustrated in Figs. 1 and 2 of the drawings. Moreover, the tire of my invention can be more closely worn down with safety than was possible with wheels of the ordinary type—for example, such as illustrated in said Figs. 1 and 2 of the drawings.

It will be apparent to those skilled in the art to which my invention appertains that in a wheel constructed according to my invention there is a far greater saving in the amount of steel to secure a given amount of service as compared with those hitherto employed.

With reference to Fig. 3, if it is assumed that the limit of safety in such a tire-section is represented by the dotted lines lettered $g$, it will be seen by comparison that such limit in the old sections (illustrated in Figs. 1 and 2) is fully reached when the tire is reduced by wear and turning for truing up by the dotted lines lettered $e$, and the absolutely unsafe limits of such sections by the dotted lines $f$, with the tread entirely worn out in the latter instance, as it is left without sufficient support for the flange to prevent breaking off thereof, while in the wheel of Fig. 3 under like conditions there is ample strength and substantial support for the flange and a safe use will thereby be permitted, owing to the proper distribution of a less quantity of steel remaining in conjunction with the interlocking rib of the tire with the body of the wheel welded thereto.

Having thus described the nature and objects of my invention, what I claim as new, and desire to secure by Letters Patent, is—

A car wheel provided with a steel tire having an internal projecting rib interlocked between two walls of a cast iron or cast steel body or center welded or fused to said tire and said rib being located in proximity to the flange side of the wheel, whereby in connection with said body or center a substantial support is established and maintained for the flange of said tire to the wear of the tread thereof to the union of the same with said body or center of the wheel, substantially as described.

In testimony whereof I have hereunto set my signature in the presence of two subscribing witnesses.

WILLIAM J. TAYLOR.

Witnesses:
J. WALTER DOUGLASS,
THOMAS M. SMITH.